United States Patent
Lawson

(10) Patent No.: US 8,297,220 B2
(45) Date of Patent: Oct. 30, 2012

(54) ROBOTIC SOAPER

(75) Inventor: Lawrence J. Lawson, Troy, MI (US)

(73) Assignee: Android Industries LLC, Auburn Hills, MI (US)

( * ) Notice: Subject to any disclaimer, the term of this patent is extended or adjusted under 35 U.S.C. 154(b) by 580 days.

(21) Appl. No.: 12/466,275

(22) Filed: May 14, 2009

(65) Prior Publication Data

US 2009/0283221 A1      Nov. 19, 2009

Related U.S. Application Data

(60) Provisional application No. 61/094,104, filed on Sep. 4, 2008, provisional application No. 61/053,698, filed on May 16, 2008.

(51) Int. Cl.
| | |
|---|---|
| *B05B 3/00* | (2006.01) |
| *B05B 7/06* | (2006.01) |
| *B05C 5/00* | (2006.01) |
| *B08B 3/04* | (2006.01) |

(52) U.S. Cl. ............... 118/323; 118/313; 118/315

(58) Field of Classification Search .......... 118/317, 118/306, 326, 73, 313–316, 321, 323; 427/42.1, 427/236; 15/21.1; 134/45, 123

See application file for complete search history.

(56) References Cited

U.S. PATENT DOCUMENTS

| | | | | | |
|---|---|---|---|---|---|
| 3,108,299 | A | * | 10/1963 | Baldwin | 15/21.1 |
| 3,346,412 | A | * | 10/1967 | Siegenthaler et al. | 427/236 |
| 4,025,981 | A | * | 5/1977 | Root et al. | 15/21.1 |
| 4,430,958 | A | | 2/1984 | Boggs | |
| 4,723,563 | A | | 2/1988 | Kane | |
| 6,151,744 | A | * | 11/2000 | Ohtani et al. | 15/88.2 |
| 7,699,087 | B2 | | 4/2010 | Rogalla et al. | |

FOREIGN PATENT DOCUMENTS

| | | |
|---|---|---|
| GB | 2148828 | 6/1985 |

\* cited by examiner

*Primary Examiner* — Yewebdar Tadesse
(74) *Attorney, Agent, or Firm* — Honigman Miller Schwartz and Cohn LLP

(57) ABSTRACT

A single-cell workstation for processing a tire-wheel assembly including a tire and a wheel is disclosed. The single cell workstation includes a soaping sub-station. The soaping sub-station includes a housing defined by a support surface and one or more walls extending from the support surface and a plurality of fluid dispensing portions extending from the support surface. An apparatus for lubricating one or more beads of a tire is also disclosed. The apparatus includes a head portion; a plurality of radially-adjustable clamping portions axially extending from the head portion; and a plurality of radially-adjustable lubrication applicators axially extending from the head portion.

17 Claims, 13 Drawing Sheets

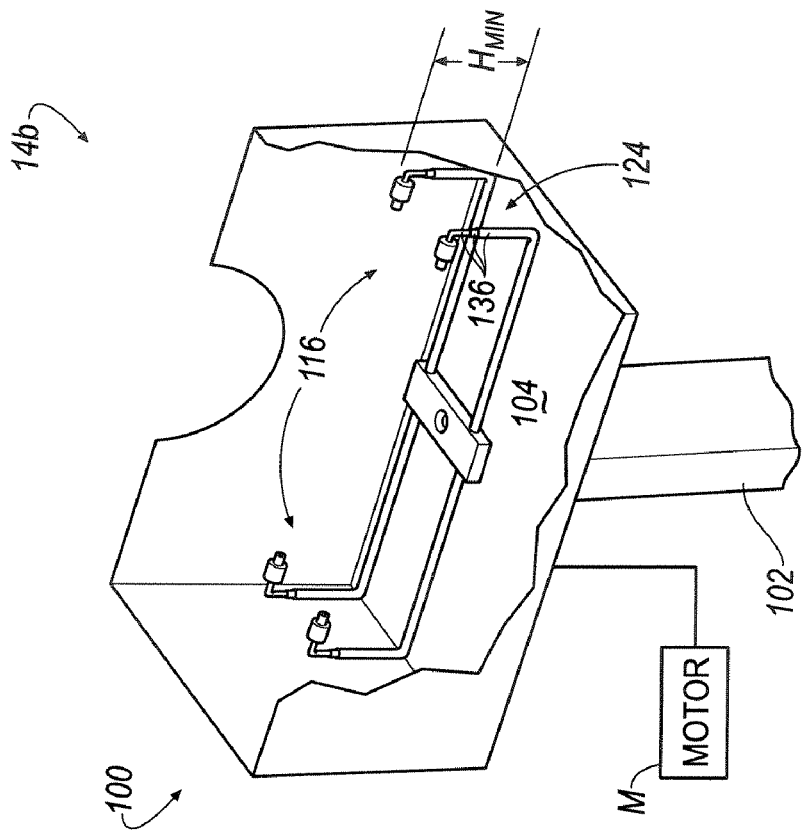
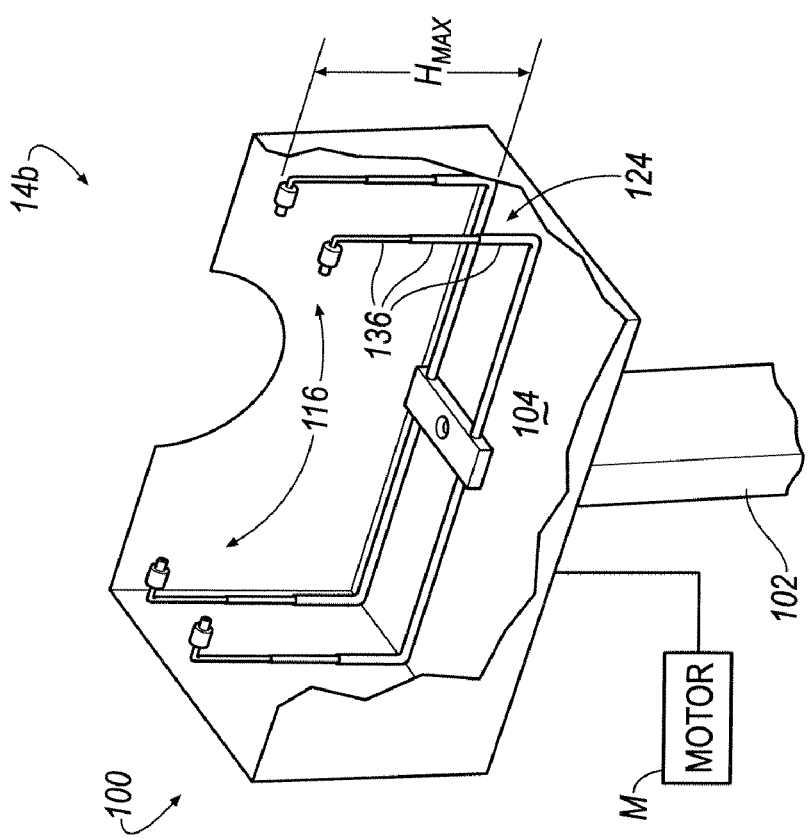

US 8,297,220 B2

ROBOTIC SOAPER

RELATED APPLICATION

This disclosure claims priority to U.S. Provisional Patent Application Ser. No. 61/053,698 filed on May 16, 2008 and 61/094,104 filed on Sep. 4, 2008.

FIELD OF THE INVENTION

The disclosure relates to tire-wheel assemblies and to a method and apparatus for processing a tire-wheel assembly.

DESCRIPTION OF THE RELATED ART

It is known in the art that a tire-wheel assembly is processed in several steps. Usually, conventional methodologies that conduct such steps require a significant capital investment and human oversight. The present invention overcomes drawbacks associated with the prior art by setting forth a device utilized for processing a tire-wheel assembly.

BRIEF DESCRIPTION OF THE DRAWINGS

The disclosure will now be described, by way of example, with reference to the accompanying drawings, in which:

FIGS. 3A-3B illustrate a sub-station of an apparatus method for processing a wheel of a tire-wheel assembly in accordance with an exemplary embodiment of the invention;

DETAILED DESCRIPTION OF THE INVENTION

The Figures illustrate an exemplary embodiment of an apparatus and method for processing a tire-wheel assembly in accordance with an embodiment of the invention. Based on the foregoing, it is to be generally understood that the nomenclature used herein is simply for convenience and the terms used to describe the invention should be given the broadest meaning by one of ordinary skill in the art.

Figure 8:
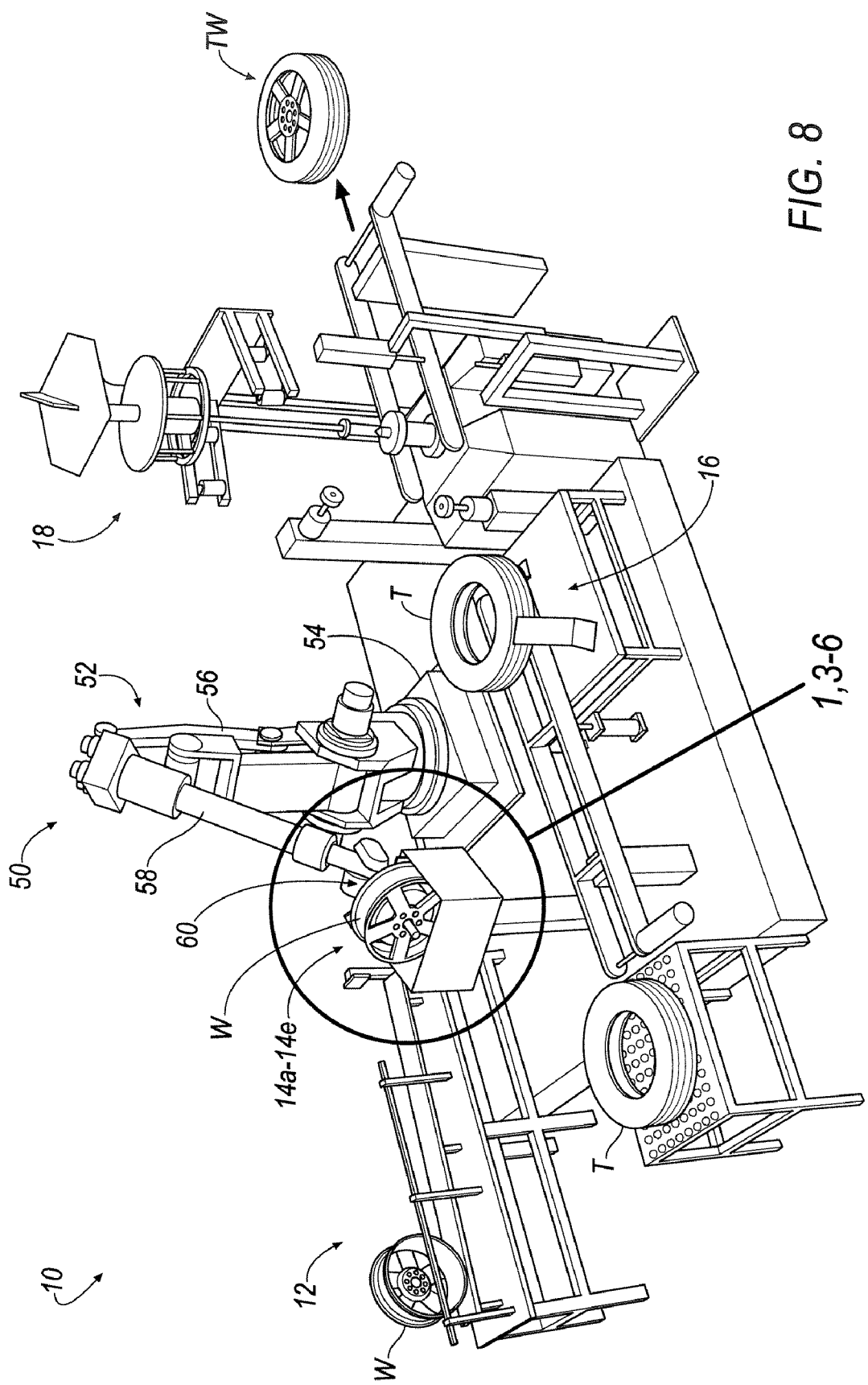
FIG. 8 illustrates a perspective view of an apparatus and method for processing a tire-wheel assembly in accordance with an exemplary embodiment of the invention.

In an embodiment, an apparatus shown generally at 10 in the FIG. 8 may be referred to as a "single-cell" workstation. In the forgoing disclosure, it will be appreciated that term "single-cell" indicates that the workstation 10 provides a tire-wheel assembly, TW, without requiring a plurality of successive, discrete workstations that may otherwise be arranged in a conventional assembly line. Rather, the single cell workstation 10 provides one workstation having a plurality of subs-stations 12-18, each performing a specific task in the processing of a tire-wheel assembly, TW. As such, the novel single-cell workstation 10 significantly reduces the cost, investment and maintenance associated with a conventional tire-wheel assembly line located on a relatively large real estate footprint. Thus, capital investment and human oversight is significantly reduced when a single cell workstation 10 is employed in the processing of tire-wheel assemblies, TW.

In an embodiment, the single-cell workstation 10 includes a device 50. In operation, the device 50 interfaces with a wheel, W, in order to prepare a tire-wheel assembly, TW. The ability of the device 50 to interface with the wheel, W, eliminates the need to "hand-off" one or more of a wheel, W, and tire, T, to a subsequent workstation of a plurality of workstations in a conventional assembly line.

In an embodiment, the device 50 associated with the single-cell workstation 10 may include a robotic arm 52 that may be located in a substantially central position relative a plurality of sub-stations. In an embodiment, a plurality of sub-stations is shown generally at 12-18.

In operation, a wheel, W, is removably-attached to the robotic arm 52. In an embodiment, the robotic arm 52 interfaces with the wheel, W, throughout some or all of the steps associated with the preparation of the tire-wheel assembly, TW. In an embodiment, the robotic arm 52 may include, for example, a base portion 54, a body portion 56 connected to the base portion 54, an arm portion 58 connected to the body portion 56, and a claw portion 60 connected to the arm portion 58.

In an embodiment, the body portion 56 is rotatably-connected to the base portion 54 such that the body portion 56 may be pivoted 360° relative the base portion 54. Further, in an embodiment, the body portion 56 may be generally hinged to the base portion 54 having, for example, hinged, scissor-style arms such that the body portion 56 may be articulated vertically upward or downward relative the base portion 54.

In an embodiment, the arm portion 58 may be connected to the body portion 56 such that the arm portion 58 may be articulated in any desirable upward or downward position relative the body portion 56. Similar to the rotatable connection of the base portion 54 and body portion 56, the claw portion 60 may be rotatably-connected to the arm portion 58 such that the claw portion 60 may be rotated, pivoted or otherwise spun more or less than 360° relative the arm portion 58. In an embodiment, movement of the portions 54-60 may be controlled manually with a joystick (not shown), or, alternatively, automatically by way of logic stored on a controller having a processor (not shown).

In the following description, it will be appreciated that prescribed movements of the body portion 56 relative the base portion 54 may have occurred before, during or after movement of the arm portion 58 and/or claw portion 60. For example, the body portion 56 may have been rotated, articulated or the like in order to locate the arm and claw portions 58, 60 to a desired position at or proximate a particular sub-station.

Regarding the general movement of the device 50 relative the sub-stations 12-18, in an embodiment, the robotic arm 52 is manipulated such that it 1) obtains a wheel, W, at a wheel repository sub-station 12, 2) lubricates/"soaps" the wheel, W, at a soaping sub-station 14*a*-14*e*, 3) mounts the soaped wheel, W, to a tire, T, at a mounting/indexing sub-station 16 to define a non-inflated tire-wheel assembly, and 4) locates the non-inflated tire-wheel assembly at an inflating sub-station 18 for inflating the non-inflated tire-wheel assembly. Subsequent to the inflating step at the inflating sub-station 18, a tire-wheel assembly, TW, may be formed. The tire-wheel assembly, TW, may be discharged from the single-cell workstation 10 for further processing by a balancing sub-station or the like.

Figure 1:
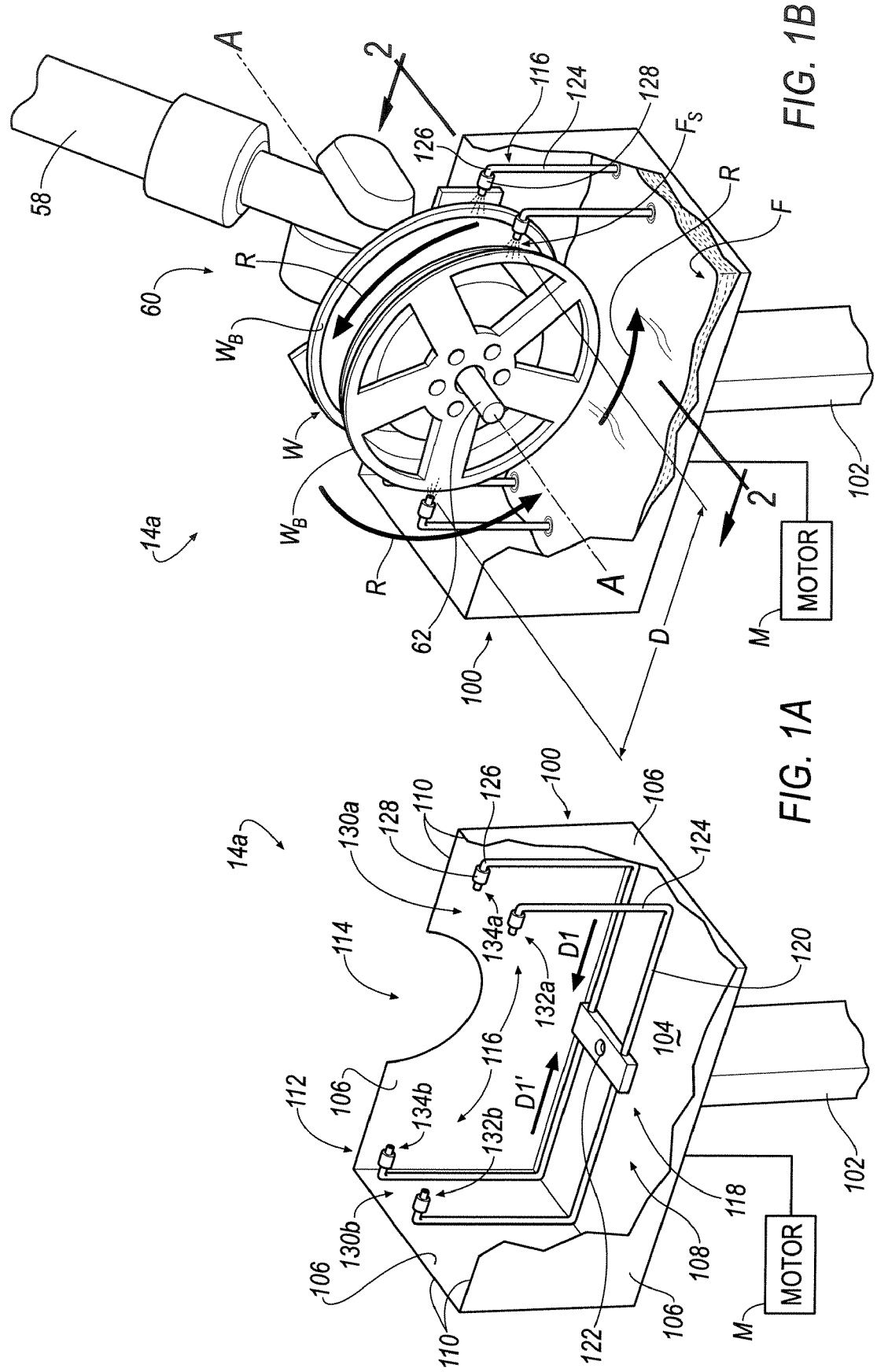
FIG. 1A illustrates a sub-station of an apparatus method for processing a wheel of a tire-wheel assembly in accordance with an exemplary embodiment of the invention.
FIG. 1B illustrates the sub-station of FIG. 1A with a wheel interfaced with a device associated with the method and apparatus.

Referring now to FIG. 1A, a soaping substation of the single-cell workstation 10 is shown generally at 14*a* according to an embodiment. As illustrated in FIG. 1B, the claw portion 60 of the device 50 retains a wheel, W, and disposes the wheel, W, proximate the soaping sub-station 14*a*.

Referring to FIG. 1A, in an embodiment, the soaping station 14*a* includes a housing or fluid retaining portion 100 that is supported by a base 102. In an embodiment, the housing 100 may include a support surface 104 attached to the base 102 and one or more walls 106 extending from the support surface 104. The one or more walls 106 generally define a cavity 108.

The one or more walls 106 are each further defined by an edge 110 that further defines an opening 112 of the housing 100. In an embodiment, one or more of the edges 110 of the one or more walls 106 may include a recess 114. In an embodiment, the recess 114 may be defined by one or more of the walls 106 to include an arcuate shape; it will be appreciated, however, that the recess 114 is not limited to include an arcuate shape and that the recess 114 may include any desirable shape.

Functionally, as seen in FIG. 1B, one or more of the opening 112 and recess 114 permits one or more of the wheel, W, and one or more portions of the device 50 to be at least partially disposed within the cavity 108. According to an embodiment, approximately half of the wheel, W, may be disposed within the cavity 108. According to an embodiment, at least a portion of the claw portion 60 is disposed in the cavity 108. In an embodiment, at least a portion of the claw portion 60 may be disposed proximate the recess 114.

According to an embodiment, the soaping station 14*a* is further defined by one or more fluid dispensing portions 116 that, in an embodiment, extend from the support surface 104. In an embodiment, a pump 118 and one or more fluid-directing channels 120 (see, e.g., FIG. 1A) connected to the pump 118 may interface with the one or more fluid dispensing portions 116. The pump 118 may include a passage 122 for receiving fluid, F (see, e.g., FIG. 1B), that is to be directed through the channels 120 and out of the one or more fluid dispensing portions 116. In an embodiment, a motor, M, may operate the pump 118.

In an embodiment, the one or more fluid dispensing portions 116 may be defined by a neck portion 124 and a head portion 126. According to an embodiment, the neck portion 124 extends substantially perpendicularly relative the support surface 104. According to an embodiment, the head portion 126 may be orientated substantially perpendicularly relative the neck portion 124.

According to an embodiment, a fluid dispensing nozzle 128 may be formed with or attached to the head portion 126 of each of the one or more fluid dispensing portions 116. In an embodiment, the fluid dispensing nozzle 128 may be adjustable in order to selectively control a fluid output from each of the fluid dispensing portions 116. The fluid output may range from, for example, a stream to a mist. In an embodiment, the fluid output from the fluid dispensing nozzle 128 may be controlled manually, by hand, or, alternatively, automatically, by a controller, according to user inputs.

According to an embodiment, the soaping sub-station 14*a* may include four fluid dispensing portions 116. According to an embodiment, the four fluid dispensing portions 116 are arranged in first pair, which are shown generally at 130*a* and a second pair, which are shown generally at 130*b*.

In an embodiment, each of the first and second pairs 130*a*, 130*b* of the four fluid dispensing portions 116 are further defined by a first fluid dispensing portion 132*a*, 132*b* and a second fluid dispensing portion 134*a*, 134*b*. In an embodiment, the fluid dispensing nozzle 128 of the first fluid dispensing portion 132*a* of the first pair 130*a*, faces the fluid dispensing nozzle 128 of the first fluid dispensing portion 132*b* of the second pair 130*b*. Similarly, in an embodiment, the fluid dispensing nozzle 128 of the second fluid dispensing portion 134*a* of the first pair 130*a*, faces the fluid dispensing nozzle 128 of the second fluid dispensing portion 134*b* of the second pair 130*b*.

According to an embodiment, the first pair 130*a* of fluid dispensing portions 116 are arranged to dispense fluid, F, in a first direction according to arrow, D1. According to an embodiment, the second pair 130*b* of fluid dispensing portions 116 are arranged to dispense fluid, F, in direction according to arrow, D1'. In an embodiment, the first direction according to arrow, D1, is orientated substantially toward the second direction according to arrow, D1'; as such, the fluid, F, dispensed from each of the first pair 130*a* is aimed substantially toward the fluid, F, dispensed from the second 130*b*.

In an embodiment, the fluid, F, dispensed from the fluid dispensing nozzles 128 is shown generally at, $F_S$, and is generally hereinafter referred to as "spray." Although the dispensed fluid, F, is described as being "sprayed," $F_S$, it will be appreciated, as explained above, that the amount of, and, style of the dispensed fluid, F, from the fluid dispensing nozzles 128 may range from, for example, a stream to a mist and that the terminology used to describe the dispersed fluid should not limit the invention.

In an embodiment, it will be appreciated that a spraying of the fluid, F, from the fluid dispensing nozzle 128 onto the wheel, W, provides a sufficient amount of fluid, F, onto the selected portions of the wheel, W, that is neither spread too heavy or too light. Although it is probable that a misting of fluid, F, may be applied to the wheel, W, the misting of the fluid, F, may not provide enough fluid upon the wheel, W, that functionally lubricates wheel, W, in order to permit a tire, T, to be easily mounted to the wheel, W. Further, although it is probable that a stream of fluid, F, may be applied to the wheel, W, a stream of fluid, F, may undesirably result in substantial amount of fluid, F, being trapped between a bead of a tire, T, and a bead seat, $W_B$, of a wheel, W, when the tire, T, is mounted to the wheel, W. Accordingly, the amount of fluid, F, that is provided by the fluid dispensing nozzle 128 may be refined, according to any desirable pattern, such as, for example, a spray, $F_S$, that is neither too heavy (e.g., as associated with a stream) or too light (e.g., as associated with a mist).

Figure 2:
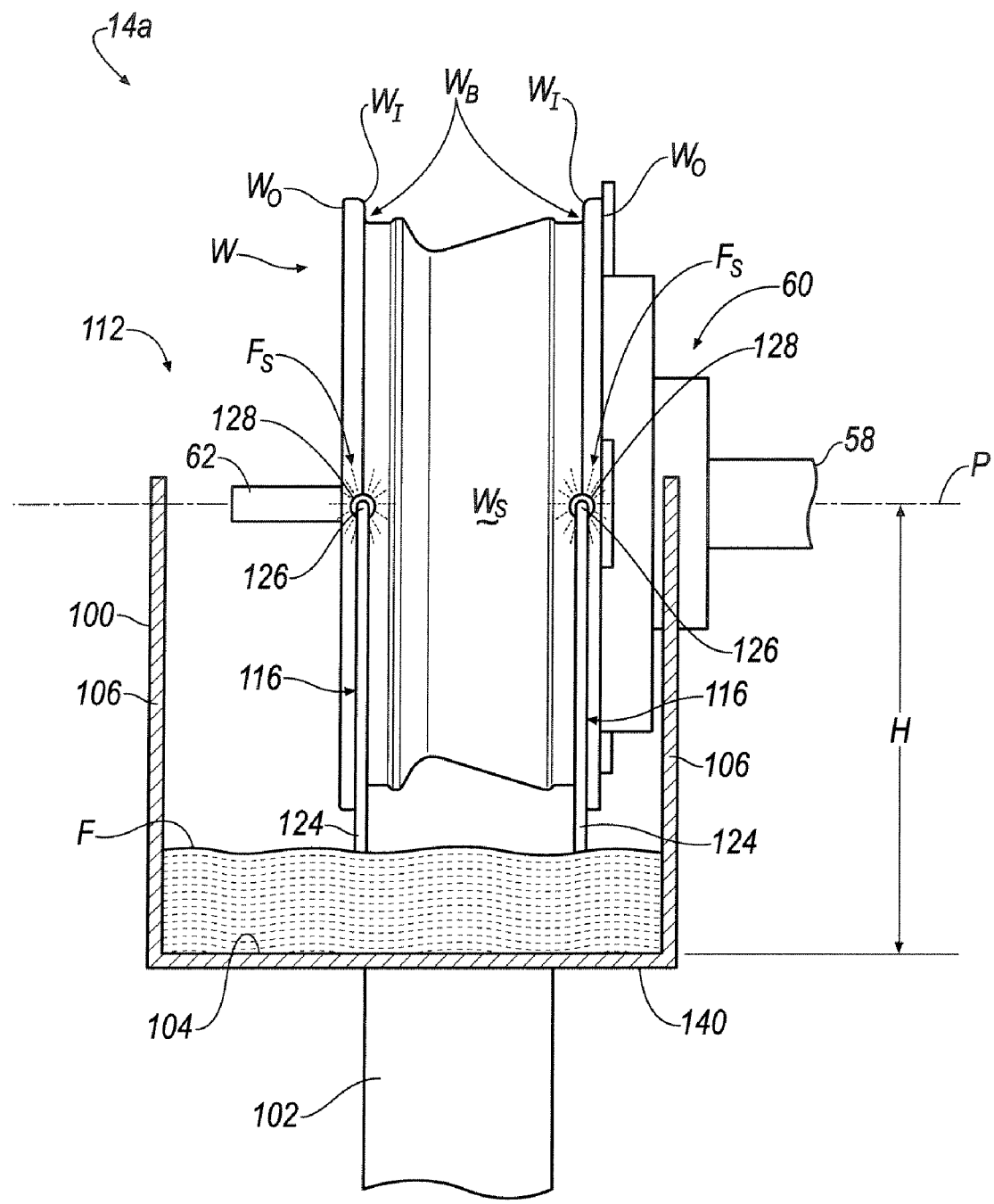
FIG. 2 illustrates a side view of the sub-station, wheel and device of FIG. 1B.

Referring to FIGS. 1B and 2, a nose portion 62 of the claw portion 60 is shown extending through the wheel, W. As illustrated, an axis, A-A, extends through the nose portion 62 and wheel, W. In general, the axis, A-A, defines an axis of rotation. In general, the device 50 causes rotation of the wheel, W, about the axis, A-A, according to the direction of the arrow, R (see, e.g., FIG. 1B).

In an embodiment, the claw portion 60 interfaces with the wheel, W. In an embodiment, the claw portion 60 may rotate relative the arm portion 58 so as to impart rotational movement of the wheel, W, according to the direction of the arrow, R. In an embodiment, it will be appreciated that the claw portion 60 may be fixed to the arm portion 58, and, rotation of the arm portion 58 according to the direction of the arrow, R, is imparted to claw portion 60 and the wheel, W, that is interfaced with the claw portion 60.

In an embodiment, as the wheel, W, is rotated according to the direction of the arrow, R, the spray, $F_S$, is applied to the wheel, W. In an embodiment, the spray, $F_S$, is directed upon one or more portions of the wheel, W. In an embodiment, the one or more portions of the wheel, W, may be defined as the bead seats, $W_B$, of the wheel, W.

In an embodiment, each bead seat, $W_B$, of the wheel, W, is located proximate a rim inner portion, $W_I$ (see, e.g., FIG. 2), of the wheel, W. A rim outer portion of the wheel, W, is shown generally at, $W_O$. In an embodiment, the wheel, W, includes two bead seats, $W_B$, that are located at opposite ends of a side surface, $W_S$ (see, e.g., FIG. 2), of the wheel, W.

In an embodiment, the fluid dispensing portions 116 are located at a height, H (see, e.g., FIG. 2), away from the support surface 104. The height, H, locates the fluid spray, $F_S$, dispersed from the fluid dispensing nozzles 128 within a plane, P; in an embodiment, the plane, P, is substantially parallel to the support surface 104 and traverses a diameter, D, of the wheel, W. Further, the first and second directions, D1, D1', of the fluid dispensing nozzles 128 are substantially perpendicular to the axis, A-A. Because of the orientation of the fluid dispensing nozzles 128 relative the wheel, W, axis, A-A, and plane, P, it will be appreciated that, in an embodiment, the wheel, W, may be rotated as little as approximately 180° in order for the spray, $F_S$, to be applied to substantially the entire bead seat, $W_B$, which circumscribes the wheel, W.

Further, it will be appreciated that all wheels, W, may not include similar dimensions. Accordingly, it will be appreciated that the fluid dispensing portions 116 may be modularly adjustable such that the fluid dispensing portions 116 are not fixed in a particular orientation relative the housing 100. For example, in an embodiment as seen in FIGS. 3A-3B, a soaping sub-station is shown generally at 14b and includes a neck portion 124 having a plurality of telescoping sub-sections 136. The plurality of telescoping sub-sections 136 permit vertical adjustment of the height, H, relative the support surface 104 to any desirable height between, for example, a maximum height, $H_{MAX}$ (see, e.g., FIG. 3A) and a minimum height, $H_{MIN}$ (see, e.g., FIG. 3B). In an embodiment, a motor, M, may be connected to the neck portions 124 for extending and retracting the telescoping sub-sections 136.

Figure 4:
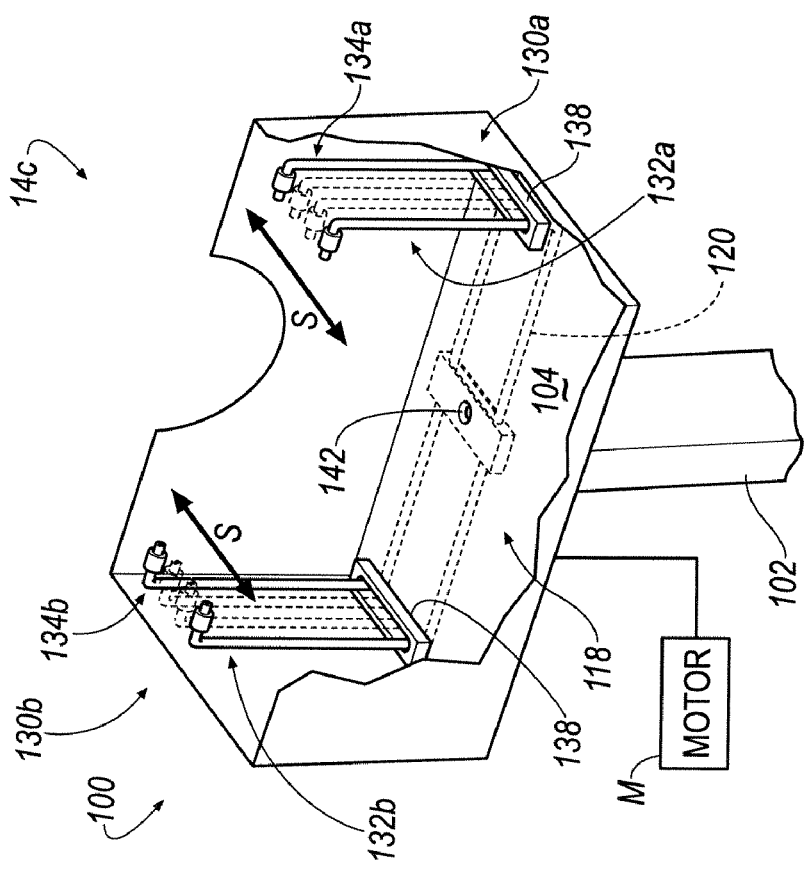
FIG. 4 illustrates a sub-station of an apparatus method for processing a wheel of a tire-wheel assembly in accordance with an exemplary embodiment of the invention.

Referring to FIG. 4, a soaping sub-station is shown at 14c according to an embodiment. As seen in FIG. 4, it will be appreciated that a horizontal spacing between the first and second fluid dispensing portions 132a, 134a and 132b, 134b of each pair 130a, 130b may be adjusted according to the direction of arrow, S. In an embodiment, for example, the each pair 130a, 130b may be interfaced within, for example, an adjustable track 138 disposed proximate the support surface 104 that permits an increase or decrease of the horizontal spacing according to the direction of arrow, S. In an embodiment, a motor, M, may be connected to the each of the adjustable tracks 138 for adjusting the horizontal spacing of each pair 130a, 130b fluid dispensing portions 116.

In an embodiment, the increase or decrease of the spacing may be provided for a wheel, W, having a larger or smaller side surface, $W_S$, that has an effect on the location of the bead seats, $W_B$, of the wheel, W. Accordingly, the adjustment of the horizontal spacing may permit the soaping sub-station 14c to functionally accommodate any number of wheels, W, having any size, shape or dimension.

Figure 5:
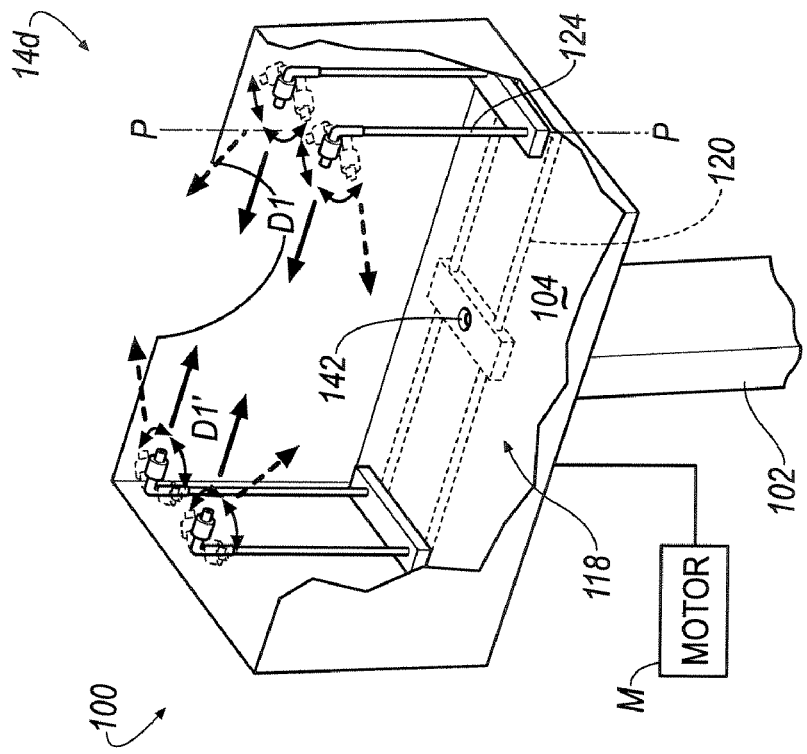
FIG. 5 illustrates a sub-station of an apparatus method for processing a wheel of a tire-wheel assembly in accordance with an exemplary embodiment of the invention.

Referring to FIG. 5, a soaping sub-station is shown at 14d according to an embodiment. It will be appreciated that, rather than adjusting the horizontal spacing, S, to accommodate wheels, W, having different sizes, shapes and dimensions, it will be appreciated that each of the neck portions 124 may be pivotably-disposed relative the support surface 104. As illustrated, for example, in FIG. 5, a pivot axis, P-P, that is orthogonal to the support surface 104 is shown extending through each of the neck portions 124. In an embodiment, a motor, M, may be connected to each of the neck portions 124 for pivoting the each of the neck portions 124 relative the support surface 104.

Accordingly, if, for example, a wheel, W, having a relatively larger side surface, $W_S$, than that shown in FIG. 2 is provided into the housing 100, each of the neck portions 124 may be pivoted outwardly about the pivot axis, P-P, such that the directions, D1, D1' of the spray, $F_S$, of each pair 130a, 130b diverges. Conversely, if desired, each of the neck portions 106 may be pivoted inwardly such that the directions D1, D1' of the spray, $F_S$, of each pair 130a, 130b converges.

In view of the embodiments of the soaping sub-stations 14b-14d shown at FIGS. 3A-5, it will be appreciated that a soaping sub-station may be provided that is not limited to any particular wheel, W, having a particular size, shape or dimension. As such, it will be appreciated that a soaping sub-station may be provided for a fixed wheel dimension (see, e.g., FIGS. 1A-2), or, alternatively, for any number of wheels irrespective of size, shape or dimension (see, e.g., FIGS. 3A-5).

Further, in an embodiment, as shown, for example, in FIGS. 4 and 5, the pump 118 and one or more fluid-directing channels 120 are not limited to being located within the cavity 108 of the housing 100. For example, the pump 118 and one or more fluid-directing channels 120 may be disposed adjacent an outer surface 140. In an embodiment, as seen in FIG. 2, the outer surface 140 is shown, for example, opposite the support surface 104. Further, if disposed adjacent the outer surface 140 of the housing 100, the passage 122 of the pump 118 may communicate with a drain 142 formed with the support surface 104.

Further, in the embodiments described above, it will be appreciated that the fluid, F, is continuously cycled within the housing 100 such that any excess fluid, F, that is sprayed, $F_S$, upon the wheel, W, will drip back toward the support surface 104 for subsequent return to the fluid directing nozzle 128. Further, in an embodiment, it will be appreciated that the pump 118 may be eliminated and that each of the fluid dispensing portions 116 may include a pump for moving the fluid, F.

Figures 6A, 6B:
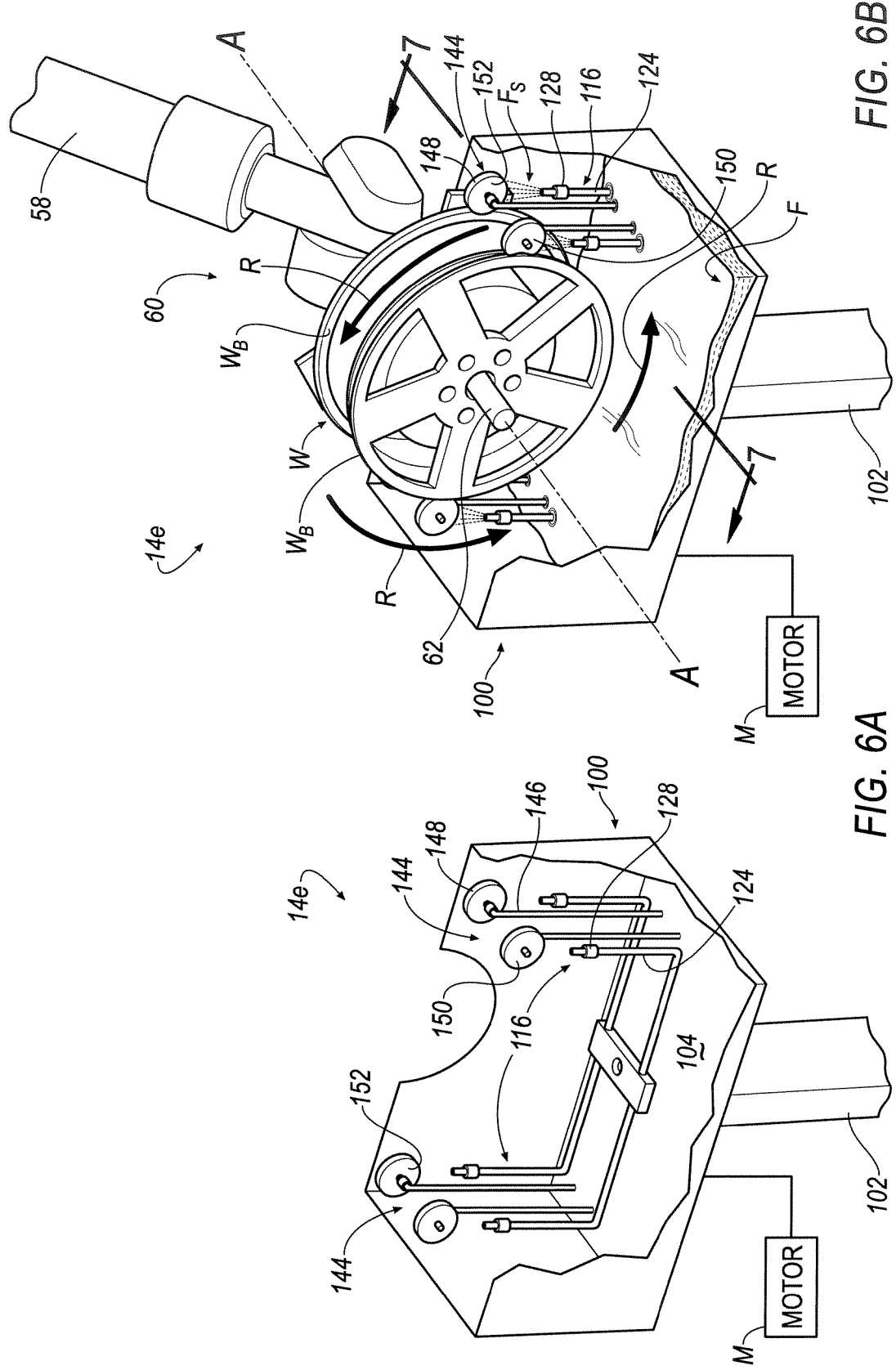
FIG. 6A illustrates a sub-station of an apparatus method for processing a wheel of a tire-wheel assembly in accordance with an exemplary embodiment of the invention.
FIG. 6B illustrates the sub-station of FIG. 6A with a wheel interfaced with a device associated with the method and apparatus.
Figure 7:
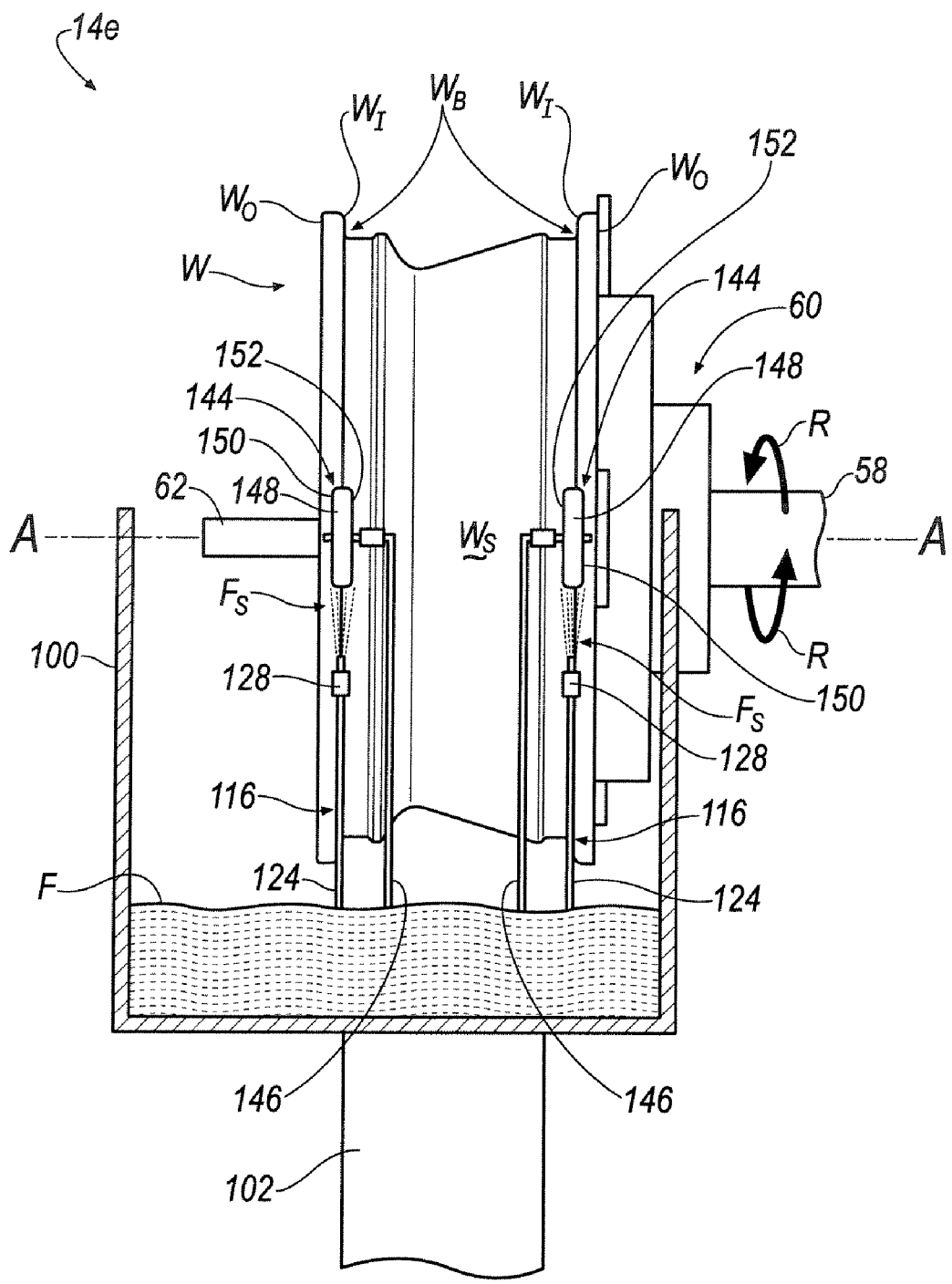
FIG. 7 illustrates a side view of the sub-station, wheel and device of FIG. 6B.

Referring to FIGS. 6A-7, a soaping sub-station is shown generally at 14e according to an embodiment. The soaping sub-station 14e is substantially similar to the soaping sub-station 14a with the exception that each of the fluid dispensing portions 116 do not include a head portion 126; as illustrated, in an embodiment, each of the fluid dispensing portions include a fluid directing nozzle 128 and a neck portion 124 extending substantially perpendicularly from the support surface 104. In an embodiment each fluid directing nozzle 128 may be formed with or attached to each neck portion 124. Because each fluid dispensing portion 116 of the soaping sub-station 14e does not include a head portion 126, each fluid directing nozzles 128 is orientated in a direction pointing away from support surface 104 such that the fluid spray, $F_S$, is not directed towards one another according to the direction of the arrows, D1, D1', shown in FIG. 1B.

As illustrated, the soaping sub-station 14e further includes a plurality of contacting pads 144 that are each rotatably-disposed upon a post 146. According to an embodiment, each contacting pad 144 includes a generally annular shape having at least a circumferential surface 148, an outer side surface 150, and an inner side surface 152.

In an embodiment, each of the fluid directing nozzles 128 are disposed proximate the plurality of contacting pads 144 such that the fluid spray, $F_S$, dispensed from the fluid directing nozzles 128 may be deposited upon the plurality of contacting pads 144. Further, in an embodiment, each of the plurality of contacting pads 144 may include an absorbent material, such as, for example, a sponge, for retaining the fluid, F, that is deposited upon the plurality of contacting pads 144.

Referring to FIGS. 6B and 7, in an embodiment, each of the plurality of contacting pads 144 are orientated for contacting the bead seats, $W_B$, of the wheel, W. In an embodiment, one or more of the circumferential surface 148 and outer side surface 150 may contact the bead seat, $W_B$. Functionally, the plurality of contacting pads 144 provide a dual function by not only transferring fluid, F, from the fluid dispensing portions 116 to the wheel, W, but, also, the plurality of contacting pads 144 meter the fluid, F, disposed upon the bead seat, $W_B$, of the wheel, W, such that any inconsistencies associated with any of the fluid dispensing nozzles 128 during the spraying of the fluid, F, upon the wheel, W, is substantially eliminated.

In an embodiment, before, during or after the bead seats, $W_B$, of the wheel, W, are disposed adjacent the plurality of contacting pads 144, the wheel, W, may be rotated according to the direction of the arrow, R, as described above. Alternatively, in an embodiment, a rotational movement applied to each of the plurality of contacting pads 144 from, for example, a motor, M, may drive the rotation of the wheel, W, such that the device 50 does not have to rotate the wheel, W, during the application of the fluid, F, to the wheel, W. Further, in an embodiment, during the rotation of the wheel, W, the fluid directing nozzles 128 may continuously spray the plurality of contacting pads 144 with the fluid spray, $F_S$, such that the fluid, F, is not completely leeched from the plurality of contact pads 144.

Although the illustrated embodiment of the soaping sub-station 14e illustrates the posts 146 and neck portions 124 in a fixed position relative the support surface 104, it will be appreciated that the posts 146 and neck portions 124 are not limited to the illustrated embodiment. In an embodiment, for example, it will be appreciated that the posts 146 and neck portions 124 may interface with or be designed to include structure that permits one or more of the posts 146 and neck portions 124 to be modularly adjustable for accommodating wheels, W, having different sizes, shapes and dimensions as shown and described in FIGS. 3A-5.

Figure 9:
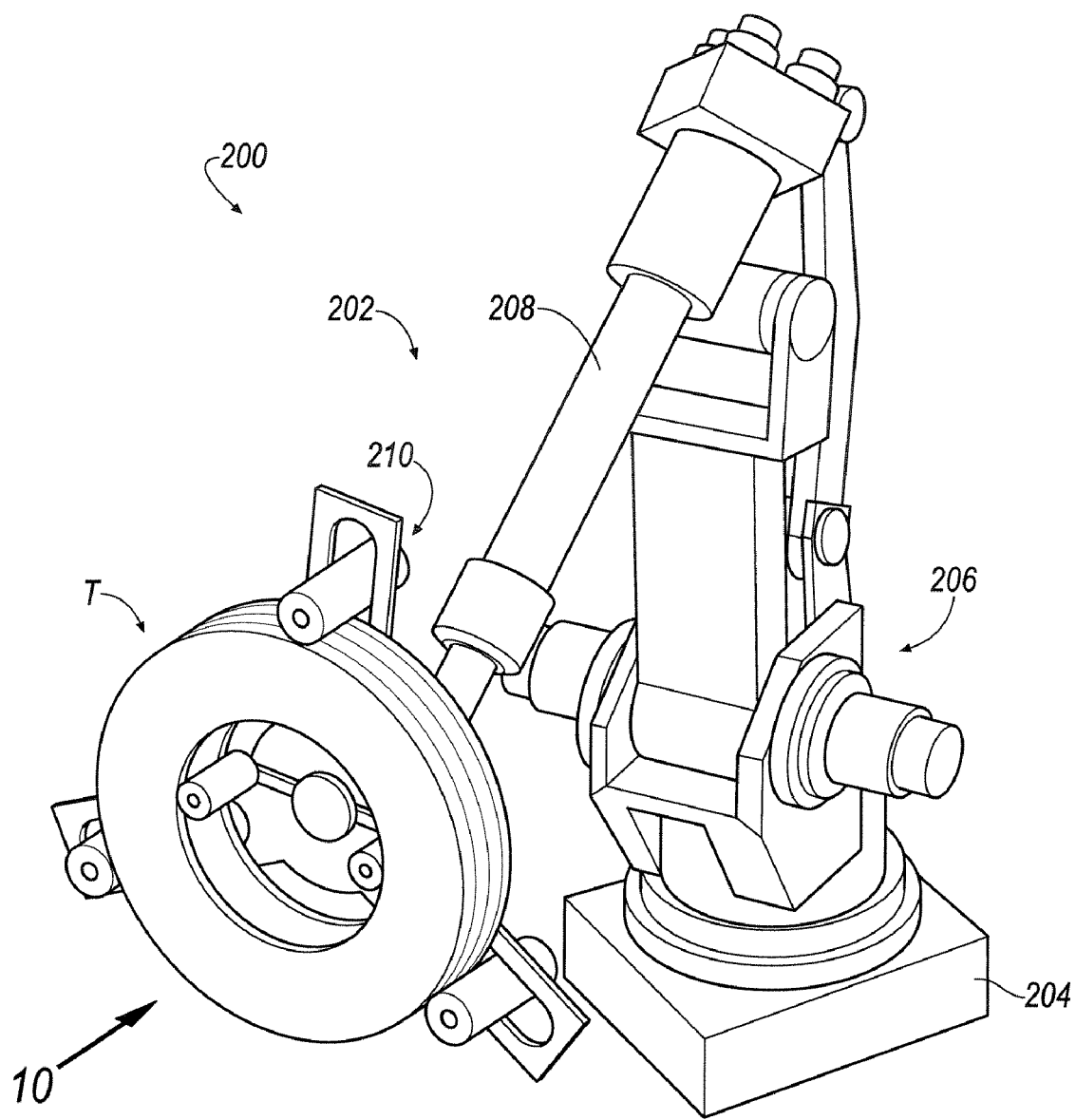
FIG. 9 is a perspective view of a device in accordance with an exemplary embodiment of the invention.

In an embodiment, a device is shown generally at 200 in FIG. 9. The device 200 may or may not interface with an apparatus such as, for example, a "single-cell" workstation. In the forgoing disclosure, it will be appreciated that term "single-cell" indicates that the workstation provides a tire-wheel assembly without requiring a plurality of successive, discrete workstations that may otherwise be arranged in a conventional assembly line. Rather, the single cell workstation provides one workstation having a plurality of substations, each performing a specific task in the processing of a tire-wheel assembly. As such, the single-cell workstation significantly reduces the cost, investment and maintenance associated with a conventional tire-wheel assembly line located on a relatively large real estate footprint. Thus, capital investment and human oversight is significantly reduced when a single cell workstation is employed in the processing of tire-wheel assemblies.

In an embodiment, referring to FIG. 9, the device 200 may interface with a tire, T, or a wheel (not shown) in order to prepare a tire-wheel assembly. According to the illustrated embodiment in FIGS. 9-11E, the device 200 interfaces with a tire, T; however, it will be appreciated that the device 200 is not limited to interfacing with a tire, T, and that the device 200 may interface with a wheel, if desired.

In an embodiment, the device 200 may include a robotic arm 202 that may be located in a substantially central position relative a plurality of sub-stations of the single-cell workstation. Alternatively, in an embodiment, the robotic arm 202 may be located proximate a hopper including a plurality of tires, T, and, the robotic arm 202 may obtain a tire, T, from the hopper in order to lubricate/soap the tire, T, prior to shuttling the tire, T, to a subsequent sub-station for mounting to a wheel.

In operation, the tire, T, is removably-attached to the robotic arm 202. In an embodiment, the robotic arm 202 interfaces with the tire, T, throughout some or all of the steps associated with the preparation of the tire-wheel assembly. In an embodiment, the robotic arm 202 may include, for example, a base portion 204, a body portion 206 connected to the base portion 204, an arm portion 208 connected to the body portion 206, and a end effector 210 connected to the arm portion 208.

In an embodiment, the body portion 206 is rotatably-connected to the base portion 204 such that the body portion 206 may be pivoted 360° relative the base portion 204. Further, in an embodiment, the body portion 206 may be generally hinged to the base portion 204 having, for example, hinged, scissor-style arms such that the body portion 206 may be articulated vertically upward or downward relative the base portion 204.

In an embodiment, the arm portion 208 may be connected to the body portion 206 such that the arm portion 208 may be articulated in any desirable upward or downward position relative the body portion 206. Similar to the rotatable connection of the base portion 204 and body portion 206, the end effector 210 may be rotatably-connected to the arm portion 208 such that the end effector 210 may be rotated, pivoted or otherwise spun more or less than 360° relative the arm portion 208. In an embodiment, movement of the portions 206-210 may be controlled manually with a joystick (not shown), or, alternatively, automatically by way of logic stored on a controller having a processor (not shown).

In the following description, it will be appreciated that prescribed movements of the body portion 206 relative the base portion 204 may have occurred before, during or after movement of the arm portion 208 and/or end effector 210. For example, the body portion 206 may have been rotated, articulated or the like in order to locate the arm and end effectors 208, 210 to a desired position.

Regarding the general movement of the device 200, in an embodiment, the robotic arm 202 is manipulated such that it obtains a tire, T, and subsequently lubricates/"soaps" the tire, T. In an embodiment, the tire, T, is lubricated/soaped directly by the end effector 210. As seen in FIGS. 10A-11E, articulated movement of the end effector 210 before, during and after a lubricating/soaping operation is described in greater detail in accordance with an embodiment of the invention.

Figure 10A:
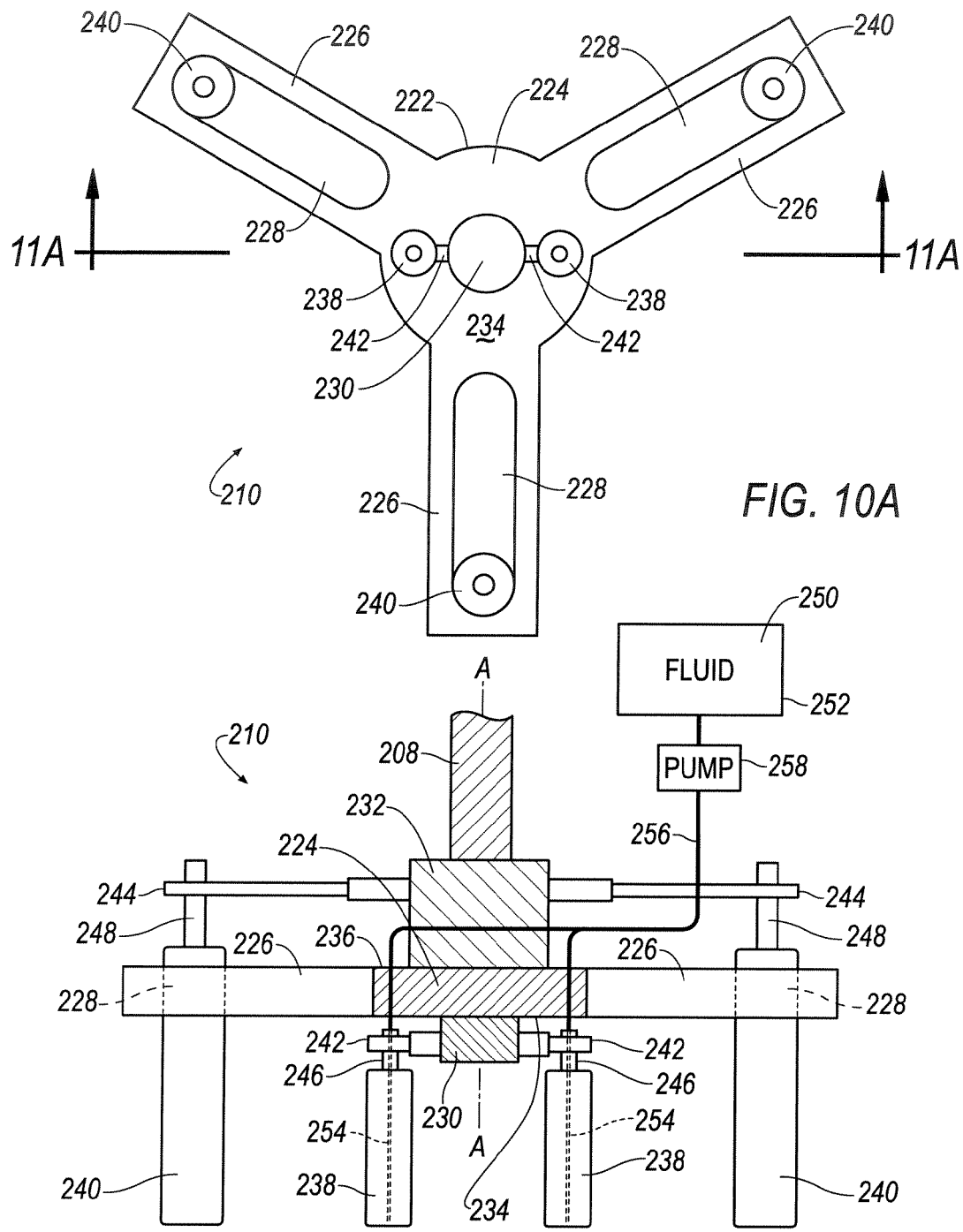
FIG. 10A is an under-side view of an end effector of the device of FIG. 9 in accordance with an exemplary embodiment of the invention.

Referring to FIG. 10A, an under-side view of the end effector 210 is shown according to an embodiment. According to an embodiment, the end effector 210 includes a head portion 222 defining a central portion 224. According to an embodiment, a central axis, A-A, extends through the central portion 224. In an embodiment, a plurality of arms 226 radially extend from the central portion 224. Each of the arms 226 define a slot or channel, which is shown generally at 228.

In an embodiment, the end effector 210 may include one or more actuators, which are shown generally at 230, 232 according to an embodiment. In an embodiment, the actuator 230 may be disposed adjacent an under-side surface 234 of the central portion 224 and the actuator 232 may be disposed adjacent an upper-side surface 236 of the central portion 224. According to an embodiment, the arm portion 208 is joined to the actuator 232.

In an embodiment, the end effector 210 may include one or more axially-extending, inner circumferential applicators, which are shown generally at 238 and one or more axially-extending, outer circumferential clamping portions, which are shown generally at 240. In an embodiment, the one or more axially-extending inner circumferential applicators 238 are joined to the actuator 230 by one or more first, radially-extending flanges, which are shown generally at 242. In an embodiment, the one or more axially-extending outer circumferential clamping portions 240 are joined to the actuator 322 by one or more second, radially-extending flanges, which are shown generally at 244. In an embodiment, each of the one or more axially-extending outer circumferential clamping portions 240 extend through the slot or channel 228 formed in each of the arms 226.

In an embodiment, the one or more first and second radially-extending flanges 242, 244 may include a plurality of radially-extending/-retracting telescoping segments or the like. In an embodiment, the actuators 230, 232 may electro-mechanically, hydraulically and/or magnetically cause the one or more first and second radially-extending flanges 242, 244 to extend radially inwardly/outwardly according to the directions of arrows D1/D1' and D2/D2' (see, e.g., FIGS. 10B, 10B and 11D, 11D).

In an embodiment, the one or more axially-extending inner circumferential applicators 238 are joined to the first radially-extending flanges 242 by one or more first, axially-extending flanges, which are shown generally at 246. In an embodiment, the one or more axially-extending outer circumferential clamping portions 240 are joined to the second radially-extending flanges 244 by one or more second, axially-extending flanges, which are shown generally at 248.

In an embodiment, the one or more axially-extending, inner circumferential applicators 238 may include an absorbent material, such as, for example, sponge, that retains a lubricating fluid/soaping solution (hereinafter, "fluid"), which is shown generally at 250. In an embodiment, a bath of fluid 250 may be retained in a reservoir 252.

The bath of fluid 250 may be carried from the reservoir 252 for receipt at the one or more axially-extending, inner circumferential applicators 238 by way of a fluid channel/pipe, which is shown generally at 254. In an embodiment, the channel/pipe 254 may be formed in at least one or more of the first axially-extending flanges 246 and extend into the one or more axially-extending, inner circumferential applicators 238; once extended into the one or more axially-extending, inner circumferential applicators 238, a portion of the channel/pipe 254 may include radial passages that defines at least a portion of the channel/pipe 254 to be "leaky" in order to permit the sponge material of the one or more axially-extending, inner circumferential applicators 238 to receive the fluid 250. In an embodiment, the channel/pipe 254 may be connected to the reservoir 252 by way of a hose 256 or the like. In an embodiment, a pump 258 may be disposed in-line with the channel/pipe 254 and/or hose 256 to assist in the movement of the fluid 250 from the reservoir 252 to the one or more axially-extending, inner circumferential applicators 238.

Figure 11A:
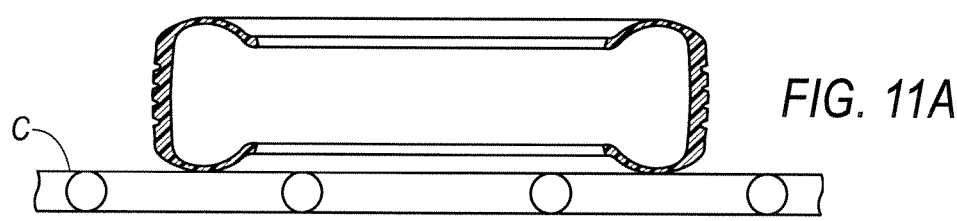
FIG. 11A is a cross-sectional view of FIG. 10A according to line 11A-11A.

In operation, the location as well as the orientation of the end effector 210 may be manipulated in order to lubricate/soap a tire, T. Referring initially to FIGS. 10A and 11A, the end effector 210 is shown in a relaxed position proximate a tire, T, that is resting on a platen, conveyor, C, or the like. The end effector 210 is subsequently moved from the relaxed position away from the tire, T, to a position proximate the tire, T.

Figure 10B:
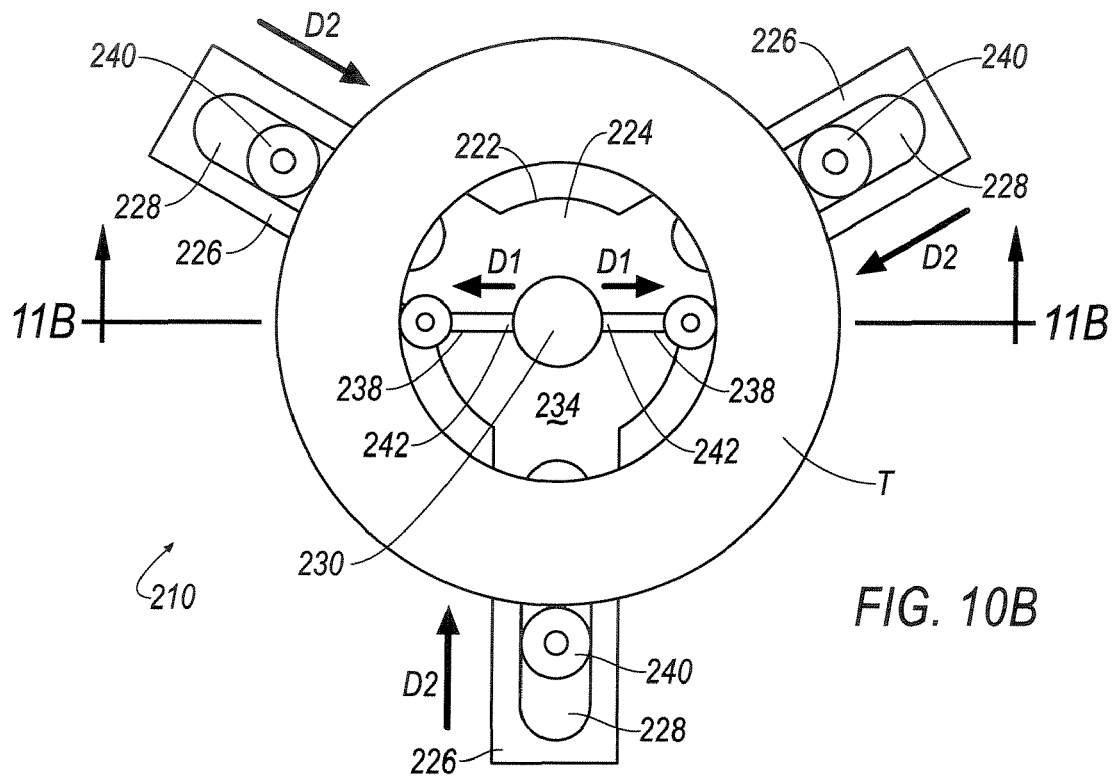
FIG. 10B is an under-side view of an end effector of the device of FIG. 9 manipulated to another position in accordance with an exemplary embodiment of the invention.
Figure 11B:
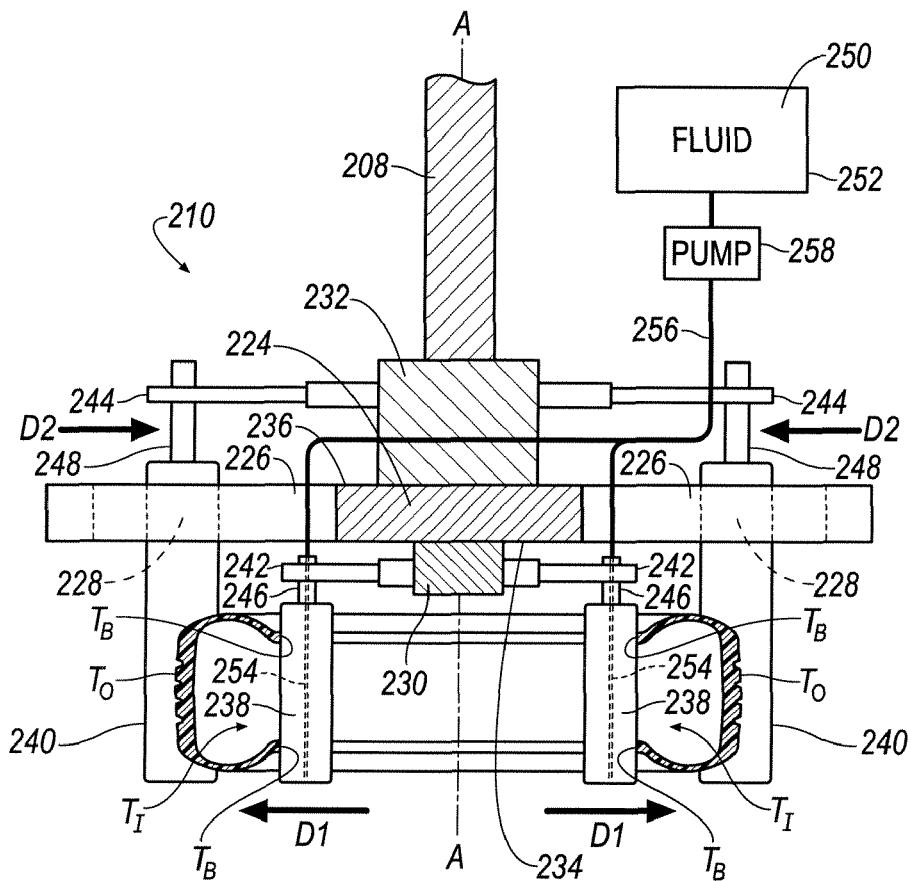
FIG. 11B is a cross-sectional view of FIG. 10B according to line 11B-11B.

As seen in FIGS. 10B and 11B, once moved proximate the tire, T, the end effector 210 is manipulated by moving the one or more axially-extending, inner circumferential applicators 238 radially outwardly according to the direction of the arrow, D1, and by moving the one or more axially-extending, outer circumferential clamping portions 240 radially inwardly according to the direction of the arrow, D2. In an embodiment, when moved according to the direction of the arrow, D1, the one or more axially-extending, inner circumferential applicators 238 engage the inner circumferential surface, $T_I$, of the tire, T. In an embodiment, when moved according to the direction of the arrow, D2, the clamping portions 240 engages the outer circumferential surface, $T_O$, of the tire, T, and thereby, in an embodiment, prevent the tire, T, from rotating about the central axis, A-A.

In an embodiment, the inner circumferential surface, $T_I$, of the tire, T, may define beads, $T_B$, of the tire, T, that are to be inserted adjacent bead seats (not shown) of a wheel (not shown). By disposing the one or more axially-extending, inner circumferential applicators 238 adjacent the beads, $T_B$, of the tire, T, the beads, $T_B$, of the tire, T, may wick the fluid 250 from the one or more axially-extending, inner circumferential applicators 238 in order to lubricate the beads, $T_B$, of the tire, T, for reducing friction between the beads, $T_B$, of the tire, T, and bead seats of the wheel during the assembly of an un-inflated tire-wheel assembly.

Figure 10C:
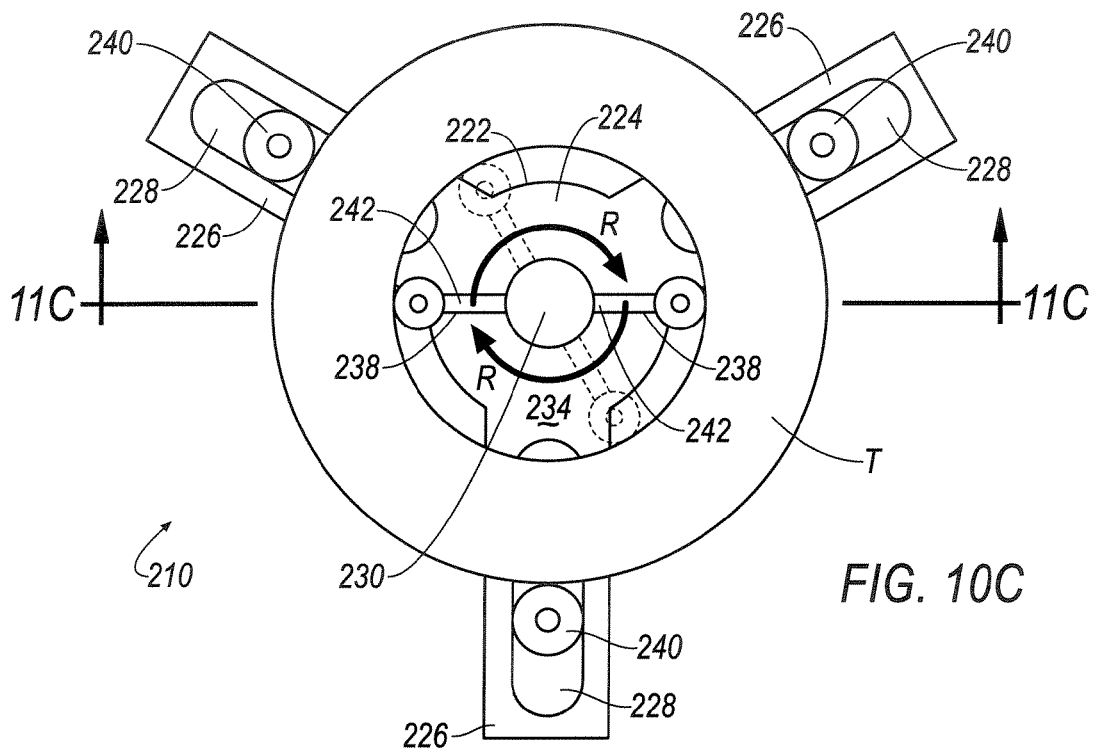
FIG. 10C is an under-side view of an end effector of the device of FIG. 9 manipulated to another position in accordance with an exemplary embodiment of the invention.
Figure 11C:
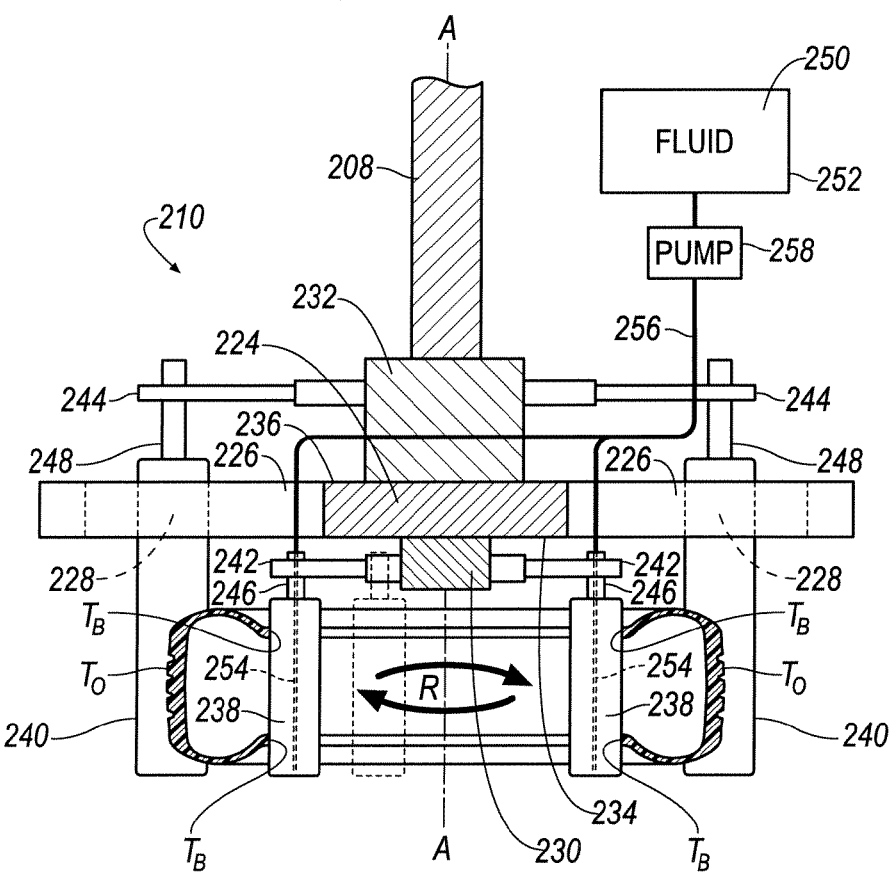
FIG. 11C is a cross-sectional view of FIG. 11C according to line 11C-11C.

Referring to FIGS. 10C and 11C, once the clamping portions 240 have been moved to engage the outer circumferential surface, To, of the tire, T, the actuator 230 disposed adjacent the under-side surface 234 of the central portion 224 is rotated about the central axis, A-A, according to the direction of the arrow, R, such that the entire circumference of the beads, $T_B$, of the tire, T, may be wicked with the fluid 250 by the one or more axially-extending, inner circumferential applicators 238. In an alternative embodiment, it will be appreciated that the clamping portions 240 may engage the outer circumferential surface, $T_O$, of the tire, T, in order to clamp and rotate the tire, T, about central axis, A-A, according to the direction of the arrow, R, as the one or more axially-extending inner circumferential applicators 238 are located in rotationally-fixed position such that the one or more axially-extending inner circumferential applicators 238 are not permitted to rotate according to the direction of the arrow, R. In yet another embodiment, it will be appreciated that the tire, T, may be clamped by clamping portions 240 and rotated in a first direction while the applicators 238 are disposed adjacent the beads, $T_B$, of the tire, T, and rotated in a second direction opposite the first direction.

Figure 10D:
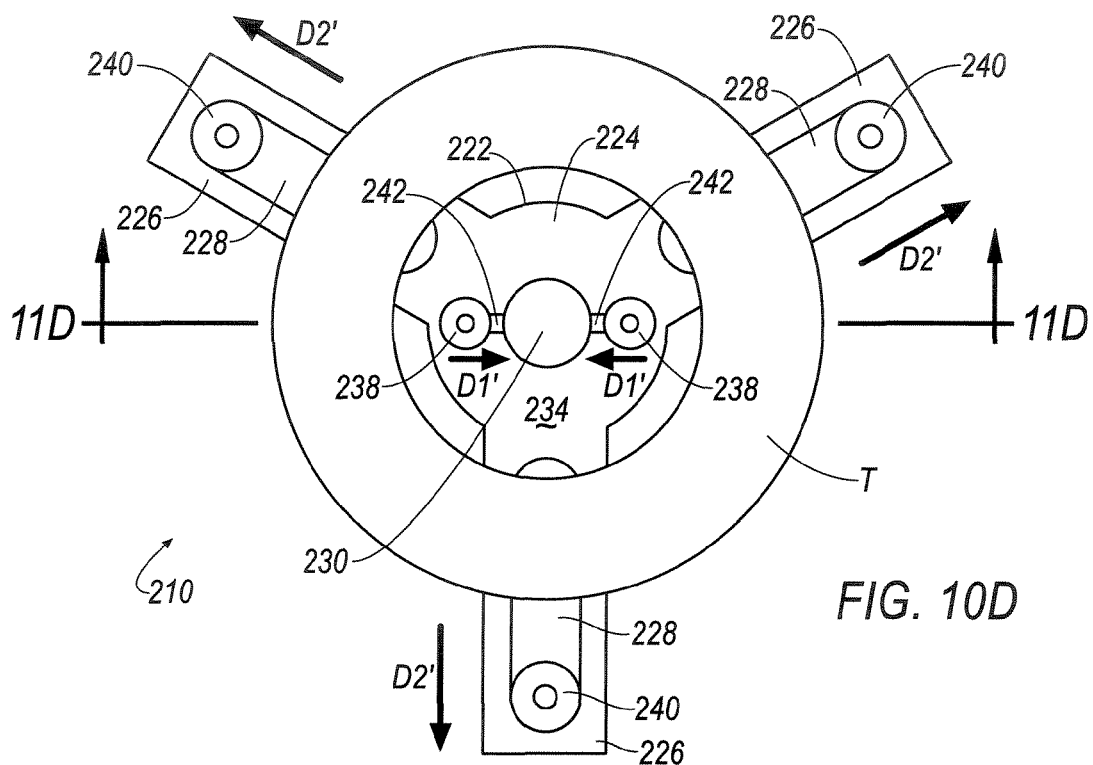
FIG. 10D is an under-side view of an end effector of the device of FIG. 9 manipulated to another position in accordance with an exemplary embodiment of the invention.
Figure 11D:
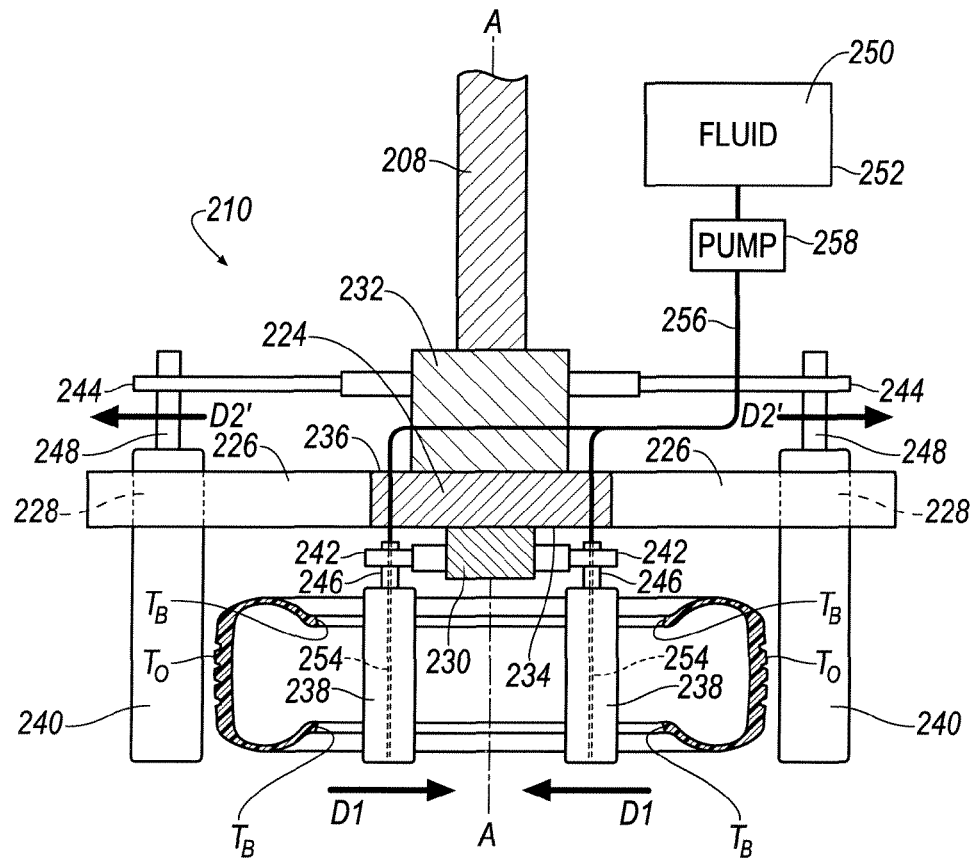
FIG. 11D is a cross-sectional view of FIG. 11C according to line 11C-11C.
Figure 10E:
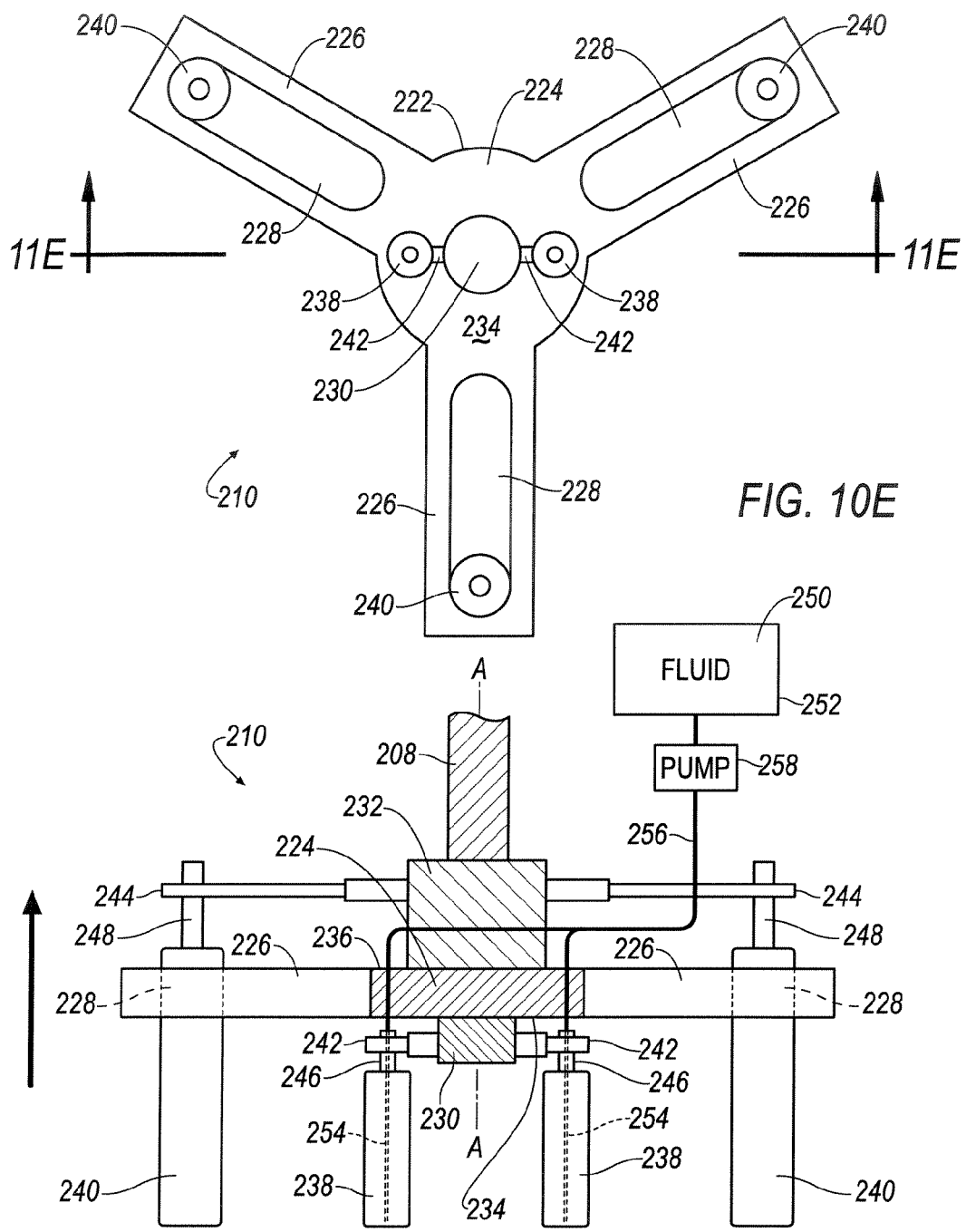
FIG. 10E is an under-side view of an end effector of the device of FIG. 9 manipulated to another position in accordance with an exemplary embodiment of the invention.
Figure 11E:
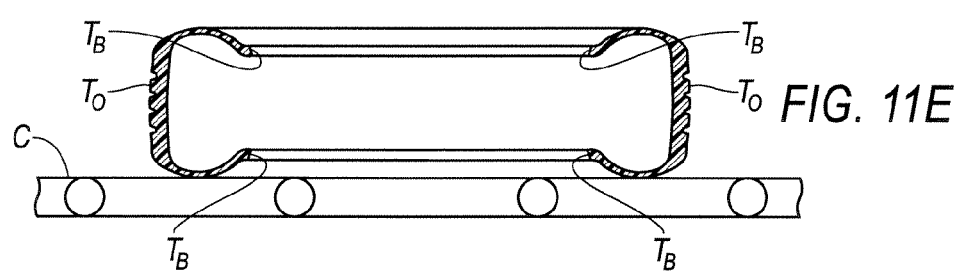
FIG. 11E is a cross-sectional view of FIG. 11E according to line 11E-11E.

Referring to FIGS. 10D and 11D, once the beads, $T_B$, of the tire, T, have been lubricated with the fluid 250, the one or more axially-extending, inner circumferential applicators 238 are moved radially inwardly in the direction according to the arrows, D1', which is opposite the direction of the arrows, D1, as the one or more axially-extending outer circumferential clamping portions 240 are moved radially outwardly according to the direction of the arrows, D2', which is opposite the direction of the arrows, D1. Then, as seen in FIGS. 10E and 11E, the end effector 210 is returned to the relaxed position.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A single-cell workstation for processing a tire-wheel assembly including a tire and a wheel, comprising:
   a soaping sub-station including
      a housing defined by a support surface and one or more walls extending from the support surface, and
      a plurality of fluid dispensing portions extending from the support surface, wherein each of the plurality of fluid dispensing portions includes: a neck portion extending substantially perpendicularly from the support surface, a head portion extending substantially perpendicularly from the neck portion, and a fluid directing nozzle connected to the head portion; and
   one or more track members disposed upon the support surface, wherein the neck portions are movably-disposed within the one or more track members.

2. The single-cell workstation according to claim 1, wherein the plurality of fluid dispensing portions include:
   a first pair of fluid dispensing portions, and
   a second pair of fluid dispensing portions, wherein each of the first and second pair of fluid dispensing portions include
      a first fluid dispensing portion, and
      a second fluid dispensing portion, wherein the fluid directing nozzle of each of the first fluid dispensing portions are aimed at one and other, wherein the fluid directing nozzle of each of the second fluid dispensing portions are aimed at one and other.

3. The single-cell workstation according to claim 1, wherein the neck portion includes a plurality of telescoping sections.

4. The single-cell workstation according to claim 1, wherein the neck portions are pivotably-disposed one the support surface.

5. The single-cell workstation according to claim 1, further comprising:
   a pump, and
   one or more fluid directing channels connected to the pump, wherein the one or more fluid directing channels are connected to the plurality of fluid dispensing portions.

6. A single-cell workstation for processing a tire-wheel assembly including a tire and a wheel, comprising:
   a soaping sub-station including
      a housing defined by a support surface and one or more walls extending from the support surface, and
      a plurality of fluid dispensing portions extending from the support surface;
   a plurality of posts including a first end and a second end, wherein the first end extends from the support surface; and
   a plurality of contacting pads, wherein each of the plurality of contacting pads are rotatably-connected to the second end of each of the plurality of posts.

7. The single-cell workstation according to claim 6, wherein each of the plurality of contacting pads are disposed proximate each of the plurality of fluid dispensing portions.

8. A single-cell workstation for processing a tire-wheel assembly including a tire and a wheel, comprising:
   a soaping sub-station including
      a housing defined by a support surface and one or more walls extending from the support surface, and
      means for depositing lubricating fluid upon bead seats of a wheel, wherein the means includes: a plurality of fluid dispensing portions extending from the support surface, wherein each of the plurality of fluid dispensing portions includes: a neck portion extending substantially perpendicularly from the support surface, a head portion extending substantially perpendicularly from the neck portion, and a fluid directing nozzle connected to the head portion; and
   means for horizontally adjusting the neck portion.

9. The single-cell workstation according to claim 8, wherein the plurality of fluid dispensing portions include:
   a first pair of fluid dispensing portions, and
   a second pair of fluid dispensing portions, wherein each of the first and second pair of fluid dispensing portions include
      a first fluid dispensing portion, and
      a second fluid dispensing portion, wherein the fluid directing nozzle of each of the first fluid dispensing portions are aimed at one and other, wherein the fluid directing nozzle of each of the second fluid dispensing portions are aimed at one and other.

10. The single-cell workstation according to claim 8, wherein the neck portion includes:
    means for vertically adjusting the neck portion.

11. The single-cell workstation according to claim 10, wherein the means for vertically adjusting includes:
    a plurality of telescoping sections defining the neck portion.

12. The single-cell workstation according to claim 8, wherein the means for horizontally adjusting includes:
    one or more track members disposed upon the support surface.

13. The single-cell workstation according to claim 8, further comprising:
    means for pivoting the neck portion relative the support surface.

14. The single-cell workstation according to claim 13, wherein the means for pivoting includes a motor connected to the neck portion.

15. The single-cell workstation according to claim 8, further comprising:
   a pump, and
   one or more fluid directing channels connected to the pump, wherein the one or more fluid directing channels are connected to the plurality of fluid dispensing portions.

16. A single-cell workstation for processing a tire-wheel assembly including a tire and a wheel, comprising:
   a soaping sub-station including
      a housing defined by a support surface and one or more walls extending from the support surface, and
      means for depositing lubricating fluid upon bead seats of a wheel, wherein the means includes: a plurality of fluid dispensing portions extending from the support surface, wherein each of the plurality of fluid dispensing portions includes: a neck portion extending substantially perpendicularly from the support surface, a head portion extending substantially perpendicularly from the neck portion, and a fluid directing nozzle connected to the head portion;
   a plurality of posts including a first end and a second end, wherein the first end extends from the support surface; and
   a plurality of contacting pads, wherein each of the plurality of contacting pads are rotatably-connected to the second end of each of the plurality of posts.

17. The single-cell workstation according to claim 16, wherein each of the plurality of contacting pads are disposed proximate each of the plurality of fluid dispensing portions.

* * * * *

UNITED STATES PATENT AND TRADEMARK OFFICE
CERTIFICATE OF CORRECTION

PATENT NO. : 8,297,220 B2
APPLICATION NO. : 12/466275
DATED : October 30, 2012
INVENTOR(S) : Lawrence J. Lawson Page 1 of 1

It is certified that error appears in the above-identified patent and that said Letters Patent is hereby corrected as shown below:

In the Claims:

At column 11, claim 4, line 66, please delete "one" and insert --on--.

Signed and Sealed this
Twenty-second Day of October, 2013

Teresa Stanek Rea
*Deputy Director of the United States Patent and Trademark Office*